(12) United States Patent
Robson et al.

(10) Patent No.: US 10,392,928 B2
(45) Date of Patent: Aug. 27, 2019

(54) AT-SURFACE COMMUNICATION WITH DOWNHOLE TOOLS

(71) Applicant: EVOLUTION ENGINEERING INC., Calgary (CA)

(72) Inventors: Robin Cody Robson, Calgary (CA); Aaron William Logan, Calgary (CA); Kurtis Kenneth Lee West, Calgary (CA); Barry Daniel Buternowsky, Calgary (CA)

(73) Assignee: Evolution Engineering Inc., Calgary (CA)

( * ) Notice: Subject to any disclaimer, the term of this patent is extended or adjusted under 35 U.S.C. 154(b) by 0 days.

(21) Appl. No.: 15/564,578

(22) PCT Filed: Apr. 20, 2016

(86) PCT No.: PCT/CA2016/050456
§ 371 (c)(1),
(2) Date: Oct. 5, 2017

(87) PCT Pub. No.: WO2016/168929
PCT Pub. Date: Oct. 27, 2016

(65) Prior Publication Data
US 2018/0087374 A1 Mar. 29, 2018

Related U.S. Application Data

(60) Provisional application No. 62/150,169, filed on Apr. 20, 2015.

(51) Int. Cl.
E21B 47/12 (2012.01)
E21B 17/00 (2006.01)
H04Q 9/00 (2006.01)

(52) U.S. Cl.
CPC .......... *E21B 47/122* (2013.01); *E21B 17/003* (2013.01); *H04Q 9/00* (2013.01); *H04Q 2209/40* (2013.01)

(58) Field of Classification Search
CPC ..................................................... E21B 47/122
See application file for complete search history.

(56) References Cited

U.S. PATENT DOCUMENTS 6,046,685 A * 4/2000 Tubel ...................... E21B 23/03
137/606
8,378,840 B2 * 2/2013 Khan ................... G01V 11/002
340/853.1

(Continued)

FOREIGN PATENT DOCUMENTS

CA 2250483 C 4/1999
CA 2843137 A1 1/2013

*Primary Examiner* — Amine Benlagsir
(74) *Attorney, Agent, or Firm* — Oyen Wiggs Green & Mutala LLP

(57) ABSTRACT

Method and apparatus for transmitting data to or from a downhole tool while the tool is at or near the surface using a wireless data link. A downhole tool comprising a gap sub having a tubular section with first and second longitudinally spaced-apart electrically-conducting parts that are electrically isolated from each other. An electromagnetic telemetry transmitter is connected to apply a potential difference between the first and second electrically conductive parts. A single-wire bus provides a data connection between one of the first and second electrically conductive parts and a data processor.

27 Claims, 4 Drawing Sheets

(56) References Cited

U.S. PATENT DOCUMENTS

| | | | |
|---|---|---|---|
| 2005/0104743 A1* | 5/2005 | Ripolone | G01V 11/002 340/855.1 |
| 2005/0161405 A1* | 7/2005 | Holland | C02F 1/485 210/695 |
| 2006/0124297 A1* | 6/2006 | Ohmer | E21B 17/003 166/250.01 |
| 2007/0175633 A1* | 8/2007 | Kosmala | E21B 47/0007 166/250.15 |
| 2011/0169656 A1* | 7/2011 | Khan | G01V 11/002 340/854.6 |
| 2012/0085583 A1* | 4/2012 | Logan | E21B 10/00 175/50 |
| 2012/0125608 A1* | 5/2012 | Parsche | E21B 43/2401 166/272.1 |
| 2013/0214934 A1* | 8/2013 | Smart | E21B 47/1005 340/854.3 |
| 2014/0262513 A1* | 9/2014 | Chau | E21B 47/011 175/40 |
| 2015/0361785 A1* | 12/2015 | Gonzales | E21B 47/12 340/855.4 |
| 2016/0010446 A1* | 1/2016 | Logan | E21B 47/12 340/854.4 |

* cited by examiner

AT-SURFACE COMMUNICATION WITH DOWNHOLE TOOLS

CROSS-REFERENCE TO RELATED APPLICATIONS

This application claims priority from U.S. Application No. 62/150169 filed 20 Apr. 2015. For purposes of the United States, this application claims the benefit under 35 U.S.C. § 119 of U.S. Application No. 62/150169 filed 20 Apr. 2015 entitled AT-SURFACE COMMUNICATION WITH DOWNHOLE TOOLS which is incorporated herein by reference for all purposes.

TECHNICAL FIELD

This application relates to subsurface drilling, specifically, to downhole tools which incorporate data communication functions. Embodiments are applicable to downhole tools that have application in drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole tool. A downhole tool may comprise any active mechanical, electronic, and/or electromechanical system that operates downhole. A downhole tool may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A downhole tool may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc.

A downhole tool may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe. Disadvantages of EM telemetry include lower depth capability, incompatibility with some formations (for example, high salt formations and formations of high resistivity contrast), and some market resistance due to acceptance of older established methods. Also, as the EM transmission is strongly attenuated over long distances through the earth formations, it requires a relatively large amount of power so that the signals are detected at surface. The electrical power available to generate EM signals may be provided by batteries or another power source that has limited capacity.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a bottom hole assembly such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface. (Higher frequency signals attenuate faster than low frequency signals.) The electromagnetic signals may be detected at the surface, for example by measuring electrical potential differences between the drill string or a metal casing that extends into the ground and one or more ground rods.

There remains a need for methods and systems useful for managing the transfer of data to and from downhole tools.

SUMMARY

The invention has a number of different aspects. One example aspect provides a method for transmitting data to or from a downhole tool while the tool is at or near the surface using a wireless data link.

Another example aspect provides a wireless data link that extends to a wireless data transceiver in a downhole tool. Such a transceiver may be built into a new downhole tool or retrofitted into a legacy downhole tool. The transceiver may provide an interface to the device hardware over which the transceiver may receive data to transmit and over which the transceiver may deliver received data to a memory or other component of the downhole tool.

Another example aspect provides a downhole tool having a communication interface for receiving and/or delivering data and commands. A transceiver may include an adapter which adapts a communication protocol of a wireless link to a communication protocol used by the downhole tool.

Another example aspect provides a downhole tool comprising a gap sub having a tubular section with first and second longitudinally spaced-apart electrically-conducting parts that are electrically isolated from each other. An electromagnetic telemetry transmitter is connected to apply a potential difference between the first and second electrically conductive parts. A single-wire bus is provides a data connection between one of the first and second electrically conductive parts and a data processor.

Further aspects of the invention and features of example embodiments are illustrated in the accompanying drawings and/or described in the following description.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
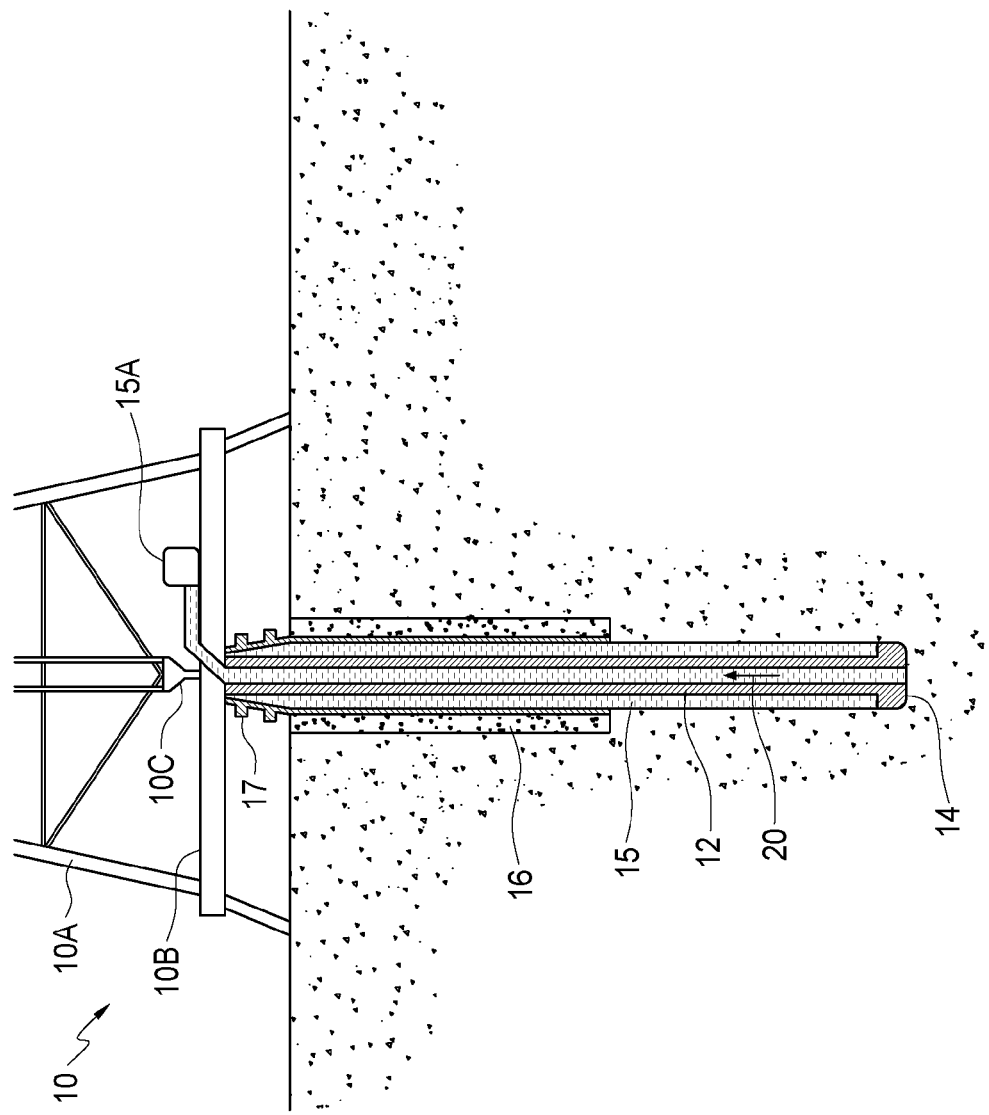
FIG. 1 is a schematic view of a drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

There is a need for methods and apparatus for exchanging data with a downhole tool when the downhole tool is at or near the surface. This need can arise in various contexts. For example, one context involves updating or altering software to be executed by one or more processors on the downhole tool. While it is possible to design a downhole tool that is configured to receive software changes by way of downlink telemetry, downlink telemetry is typically very slow compared to communication methods that may be applied when a downhole tool is located at or near the surface. Another circumstance in which it is desirable to establish data communication with a downhole tool is when one wishes to extract logged information from the downhole tool when the downhole tool is brought back to the surface. Such information may be recorded in a memory of the downhole tool. Although some such information may have been transmitted to the surface by use of telemetry while the tool was downhole, it can be the case that less than all of the logged information is transmitted by telemetry, for example, to conserve bandwidth, to conserve electrical power, or due to a malfunction while the tool was downhole. Another purpose for exchanging data with a downhole tool is to retrieve diagnostic or status information from the tool.

Some embodiments involve transmitting data to or from a downhole tool while the tool is at or near the surface using a wireless data link. Such a wireless data link may extend to a wireless data transceiver in a downhole tool. Such a transceiver may be built into a new downhole tool or retrofitted to a legacy downhole tool. In either case, the transceiver may provide an interface to the device hardware over which the transceiver may receive data to transmit and over which the transceiver may deliver received data to a memory or other component of the downhole tool. In some embodiments, a downhole tool has a communication interface for receiving and/or delivering data and commands and the transceiver includes an adapter which adapts a communication protocol of the wireless link to the communication protocol used by the downhole tool.

The transceiver may receive and/or deliver data and commands at a variety of frequencies. In particular embodiments, the transceiver receives and/or delivers data at a frequency within the unlicensed industrial, scientific and medical radio bands (commonly referred to as the ISM band). In particular, this may include frequencies in the range of approximately 300 Mhz to 450 Mhz. The frequency used by the transceiver may be limited by the antenna design. In some embodiments, multiple antennas are present for use with multiple frequencies. The transceiver may be adjusted manually, or automatically, to function using different frequencies. For example, the transceiver may be capable of performing self-automated-carrier-tuning.

The transceiver may receive and/or deliver data and commands using a variety of wireless protocols. The wireless protocol may use a generic structured or unstructured serial data packet style protocol which may vary depending on the type of data being transferred. Alternatively, the transceiver may use a customized wireless protocol for addressing multiple devices at once. In some embodiments, the transceiver may use a customized wireless protocol that can is compatible with multiple devices using multiple protocols.

Providing such a transceiver may permit high speed wireless communication with the tool. Where the tool is a legacy downhole tool, the high speed wireless communication may be provided without any required modification to the current electronics or firmware of the downhole tool except as may be needed to connect the interface to an existing data port of the downhole tool.

In some embodiments, a wireless transceiver is designed to be temporarily attached to a downhole tool when the downhole tool is at the surface. For example, the wireless interface may connect to a wired interface provided by the tool. Some downhole tools, for example, include an internal communication bus such as a QBus™ or a CanBus™. In some embodiments, such tools include a connector that allows an external device to be coupled to the internal data communication bus. In some embodiments, a data transceiver is attached to the bus while the downhole tool is at the surface using such a connector.

Figure 2:
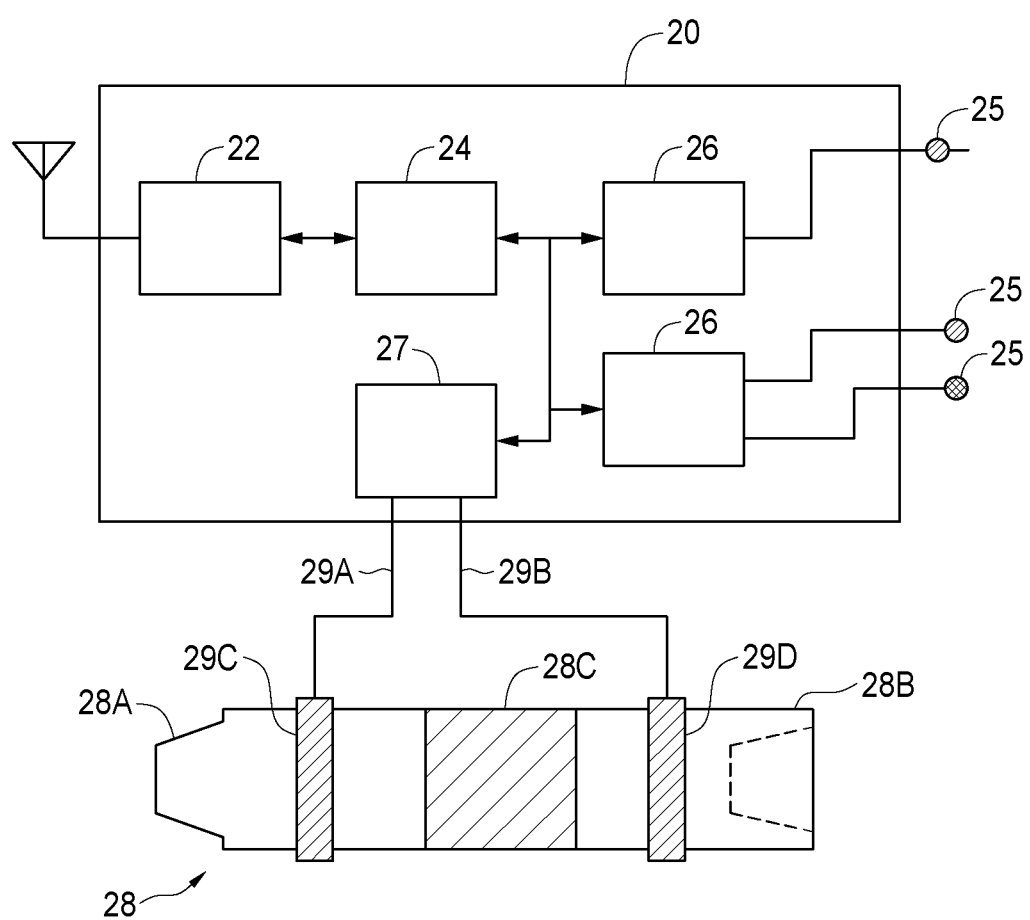
FIG. 2 is a block diagram of an example data adapter.

FIG. 2 shows a data adapter 20 according to an example embodiment. Data adapter 20 comprises a wireless transceiver 22, a programmable controller 24, a network interface 26 (e.g. a QBus or CANBUS node) and one or more physical connectors 25 for coupling in to a data port of a downhole tool. Wireless transceiver 22 may use a protocol based on TCP/IP and/or may use address filtering techniques for multiple devices in a network. Wireless transceiver 22 may also include packet loss recovery features. In some embodiments, multiple data connectors 25 are provided. Each of data connectors 25 may allow device 20 to be connected to a downhole tool having a different physical configuration and/or a different communications protocol. Connectors 25 may receive and/or transmit data to a downhole tool using signalling provided by a suitable interface 26 under control of controller 24.

Some downhole tools may have wireless communication capabilities provided by way of an internal wireless transceiver. Apparatus 20 may optionally include one or more wireless transceivers for establishing communication with such downhole tools.

A person equipped with apparatus 20 may use apparatus 20 to apply high speed two way communication with any of a very wide variety of downhole tools.

In some embodiments, a downhole tool comprises an electromagnetic telemetry transmitter. For example, the telemetry transmitter may apply signals between two output terminals that can be detected by an electromagnetic telemetry receiver. Output terminals of the electromagnetic telemetry transmitter may, for example, be in electrical contact with two ends 28A and 29B of a gap sub 28 that are electrically isolated from one another by an electrically insulating gap 28C. In some embodiments, one or both output terminals of an electromagnetic telemetry transmitter also serve as terminals for use in at-surface data communication with the downhole tool. For example, an apparatus 20 may interface to a downhole tool by way of conductors that contact a gap sub on either side of the gap. The conductors may be held in electrical contact with conductive surfaces of the gap sub by straps or clamps, for example. In the illustrated embodiment, apparatus 20 includes an interface 27 connected to conductors 29A and 29B that can respectively be held in electrical contact with a gap sub by straps 29C and 29D.

In some embodiments, communication with a downhole tool at the surface is implemented by a single-wire bus that includes a conductor that is connected to a terminal on the outside of a drill string. In a case where the downhole tool includes a gap sub, one side of the gap sub may be used as a ground reference while the other side of the gap sub may be used as a terminal for communication with the downhole tool.

In an example embodiment, the single-wire bus comprises a LIN (local interconnect network) bus. Details of the LIN bus can be found on the website www.lin-subbus.org. In an example embodiment, a downhole tool comprises a LIN bus node that is connected across a gap in a gap sub. To communicate with the downhole tool by way of a LIN bus, a grounding strap or the like may be wrapped around the drill collar on one side of the gap sub. A conductor for the LIN bus may be connected to the gap sub on the opposing side of the gap. An external computer may then use the LIN bus to supply data and/or commands to the downhole tool or to receive data and/or commands from the downhole tool. In some embodiments, the single-wire bus is integrated into a storage rack located at the surface of the drilling rig where downhole tools are stored.

Many downhole tools include data registers and/or firmware or other computer software stores which affect the operation of the downhole tools. It is often necessary to set such registers, firmware, and/or other data stores in order to use the downhole tool for a particular application. Apparatus 20 may be applied to configure downhole tools of a wide variety of types for deployment in specific applications.

In some cases, a drilling operation will involve the use of multiple distinct downhole tools that are all carried by the drill string. These downhole tools may provide a range of different functions. It is often desirable to configure such tools in a compatible way. For example, each tool may include a clock. It may be desirable to synchronize the clocks before sending the tools downhole. Synchronizing clocks may be accomplished using a GPS receiver located in a wireless bridge. Using coordinate requests, up-to-date timestamps can be obtained and included with high accuracy. The timestamps may be transmitted to a wireless transceiver as part of the downhole tool which shares the timestamps with all of the nodes.

Where the downhole tools each have a telemetry system, it may be desirable to configure the tools so that telemetry signals from one tool do not interfere with telemetry signals from the other tool. For example, two tools may be configured to transmit telemetry signals in different time windows or to use different frequency bands for telemetry signals and/or to use distinct telemetry modes (e.g. one tool may be configured to transmit mud pulse telemetry signals while another tool transmits electromagnetic telemetry signals). In other embodiments, one or more tools may be configured to contemporaneously transmit and/or receive signals at multiple (spaced apart) frequencies. Each tool can filter out unwanted frequencies at each receiver. Apparatus 20 may be used to facilitate the simultaneous or near simultaneous configuration of multiple downhole tools. This can provide significant efficiencies in comparison to a case where the technician must individually configure multiple tools. Apparatus 20 may include a graphical user interface to allow an operator to access basic options such as operating frequency, power level and data rate while automatically configuring complicated features such as filtering setup, modulation schemes etc. In some embodiments, each tool is placed in wireless connection with a computer system which coordinates the configuration of the multiple tools. The tools may, for example, be configured to encode data in similar ways such that a common data decoder may be used to decode signals from both tools.

Downhole tools typically include one or more sensors for acquiring information regarding the tool, the surroundings of the tool, and/or the status of drilling operations. Some types of such sensors are described above. While the tool is operating downhole, the tool may transmit some of the sensor readings to the surface by way of a suitable telemetry system. Due to bandwidth constraints, it may not be possible or desirable for the telemetry system to transmit to the surface all of the data that its sensors pick up. Furthermore, if a telemetry system fails, then it may be impossible to transmit to the surface data acquired by a downhole tool.

Figure 3:
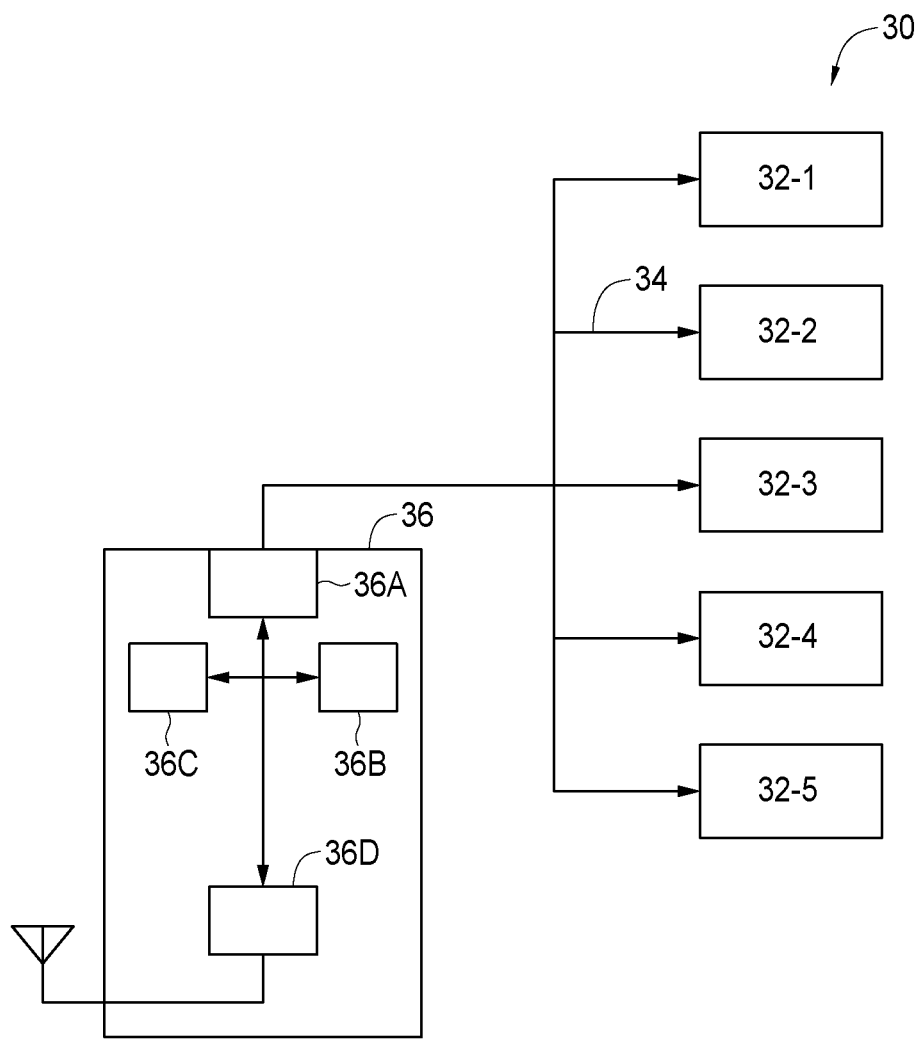
FIG. 3 is a schematic diagram showing a downhole tool according to an example embodiment.

FIG. 3 illustrates a downhole tool according to an example embodiment which provides a backup data logging system which logs data recorded by various sensors of downhole tool 30. In the illustrated embodiment, downhole tool 30 has an architecture made up of a plurality of modules 32 (modules 32-1 to 32-5 are shown) interconnected with one another by a data bus 34 which may, for example, comprise a CanBus™. Also connected to data bus 34 is a combined logging device and transceiver 36. The logging device and transceiver may include its own dedicated processor. The processor may coordinate the acquisition and storage of data from one or more of modules 32 in a memory while downhole tool 30 is being used.

In the illustrated embodiment, transceiver/logging device 36 includes a bus interface 36A, a programmable controller 36B, a data store 36C, and a wireless transceiver 36D. Interface 36A allows processor 36B to communicate with other modules by way of bus 34. In some embodiments, data store 36C comprises a non-volatile memory such as a flash memory. In addition to or instead of storing sensor readings and readings of diagnostic information, a logging system may log activity on bus 34. Logs of such activity may be valuable for failure analysis. Processor 36B may, for example, be configured to periodically poll different ones of modules 32 in order to receive and to store in data store 36C sensor readings, readings in diagnostic registers, or the like. In other embodiments, modules 32 may be programmed to periodically transmit certain data to logging module 36. In other embodiments, processor 36B may be configured to perform bus monitoring searches for atypical tool behaviour wherein bus traffic is logged in the event of specified flags being triggered.

When downhole tool 30 is returned to the surface, the log information may be transmitted by way of transceiver 36D to another computer system which may store and/or process and/or retransmit that information.

In an alternative embodiment, data is logged in one or more of modules 32 and the logged data may be retrieved by processor 36B over bus 34 for transmission by way of transceiver 36D. Transceiver 36D may be a relatively high performance transceiver offering fast data throughput such that a large volume of data may be very quickly extracted from downhole tool 30 when downhole tool 30 is brought to the surface. In some embodiments, downhole tool 30 is configured to automatically upload logged data to a computer system as soon as data communication with that computer system has been established. This may occur automatically as soon as the downhole tool 30 has reached or is near the surface.

In some embodiments, data is logged in memories in individual modules 32 and transceiver 36 includes a mode in which data that has been logged at nodes 32 is automatically retrieved into transceiver/logging unit 36 from where the logged data may be rapidly uploaded as soon as the downhole tool 30 reaches the surface.

Transceiver 36D may have a standby mode in which it is generally powered down except for a low power circuit that detects whether or not transceiver 36 is within range of another compatible transceiver. When a radio signal from a compatible transceiver is detected, the transceiver may switch from its standby mode into an active mode. Such wake-on radio functionality may be used to switch on transceiver 36D as soon as the downhole tool 30 has reached or is near to the surface.

Downhole tools are often integrated with or installed in the bore of drill collars which are typically electrically conductive. The presence of the drill collar typically shields the downhole tool in a manner that can interfere with wireless data transmission to or from the downhole tool. To overcome this limitation, lower frequencies may be used for wireless data communication. However, using lower frequencies (e.g. frequencies in the sub-1 gigahertz band) can limit the maximum available data rate.

Some embodiments provide multiple transceivers which operate simultaneously on different frequencies. In some embodiments, all of the frequencies are less than 1 GHz. Each transceiver may include filters to block out signals in the frequency ranges of the other transceiver(s). The transceivers may use the same antennae. For example, in some embodiments a drill collar and/or a landing spider and/or a transmission rod act as an antenna for a plurality of transceivers in a downhole tool.

Figure 4:
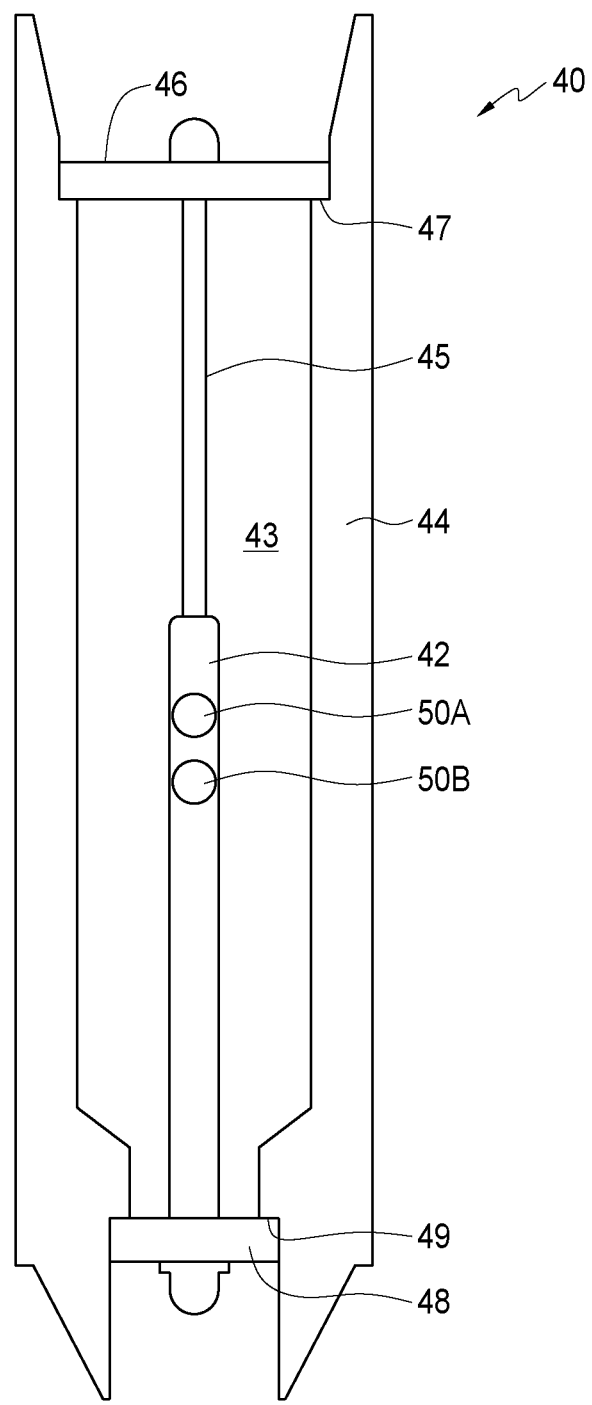
FIG. 4 is a schematic view showing a downhole tool equipped with plural wireless transceivers.

FIG. 4 illustrates, for example, a downhole tool 40 in the form of a probe 42 which is housed within a bore 43 of a drill collar 44. One end of probe 42 attaches to a transmission rod 45 which extends to a spider 46 which engages a landing 47 within bore 43. Another end of probe 42 comprises a spider 48 which engages a landing 49 in bore 43. Transceivers 50A and 50B are each located inside probe 42 and each have an antenna terminal connected to one of the above components. In some embodiments, a grounded shield is provided covering the conductive path along transmission rod 45 and spider 46. Additional grounded shielding may be provided on the connection (e.g. conducting wire) between the transceiver (e.g. transceivers 50A and 50B) and transmission rod 45 and spider 46. In some embodiments, it is beneficial to leave spider 46 unshielded to allow for propagation of the wireless signal from either end of the collar to improve the signal range. In some embodiments, additional ground shielding is not required because the down-hole telemetry tool is unlikely to see interference due to the minimal physical diameter of the drill string (e.g. if the transceiver signal is in the 300-450 MHz range).

In an example embodiment, one of the transceivers 50A transmits and receives in the 434 megahertz band, whereas the other transceiver 50B transmits and receives in the 315 megahertz band. In this embodiment, the 434 megahertz transceiver 50A incorporates filters which block signals in the 315 megahertz band. Similarly, transceiver 50B, which operates in the 315 megahertz band, incorporates filters which block signals in the 434 megahertz band.

A controller in the tool may handle all data communications between the tool and the outside world by splitting the data communications between the two transceivers which can be operated in a coordinated fashion to transmit the required data. In some embodiments, a controller of downhole tool 40 splits a single data stream into two parts that are each transmitted on a corresponding one of transceivers 50A and 50B. The two parts are received at corresponding receivers. The received parts may then be recombined to yield the original data stream. In other embodiments, separate data streams are sent by transmitters 50A and 50B.

Since transmitters 50A and 50B can operate independently of one another, the two transceivers may be operated to simultaneously transmit or receive data from tool 42. In the alternative, one of transceivers 50A and 50B may be applied to receive data while the other of transceivers 50A and 50B is applied to transmit data.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A downhole tool comprising:
   a gap sub comprising a tubular section having a first electrically-conducting part and a second electrically-conducting part longitudinally spaced-apart and electrically insulated from the first electrically-conducting part;
   an electromagnetic telemetry transmitter connected to apply a potential difference between the first electrically-conducting part and the second electrically-conducting part; and
   a single-wire bus providing a data connection between the first electrically-conducting part and a network interface in communication with a data processor, wherein:
   the network interface comprises a node of the single-wire bus;
   the first electrically-conducting part forms at least part of a first surface;
   the second electrically-conducting part forms at least part of a second surface;
   the first surface and second surface form part of an exterior of the gap sub; and
   the second electrically-conducting part is connected to provide a reference potential for the single-wire bus.

2. A downhole tool according to claim 1 wherein the single-wire bus comprises a local interconnect network bus.

3. A downhole tool according to claim 1 in combination with a data interface device comprising first and second conductors respectively in electrical contact with the first surface and the second surface and the node of the network interface.

4. A downhole tool according to claim 3 in combination with a storage rack wherein the storage rack provides the first and second conductors and the first and second conductors make contact with the first surface and the second surface when the gap sub is received in the storage rack.

5. A downhole tool according to claim 3 wherein the first and second conductors are connected to carry data communications to or from the downhole tool.

6. A downhole tool according to claim 3 connected to an external computer by way of a grounding strap in electrical contact with the second surface and a data-carrying conductor in electrical contact with the first surface.

7. A downhole tool according to claim 1 in combination with an external computer connected to supply data and/or commands to the downhole tool or to receive the data and/or commands from the downhole tool by way of the single-wire bus.

8. A downhole tool according to claim 1 further comprising a wireless data transceiver having a wired output temporarily connected to the single-wire bus.

9. A downhole tool according to claim 1 further comprising a data store, one or more sensors and a wireless data transceiver wherein the data processor is configured to store sensor data derived from outputs of the one or more sensors in the data store and to automatically transmit the stored sensor data from the data store over the wireless data transceiver upon detecting that the wireless transceiver has established data communication with another data transceiver.

10. A downhole tool according to claim 9 further comprising a plurality of first wireless data transceivers.

11. A downhole tool according to claim 10 wherein the plurality of first wireless data transceivers are connected to a common antenna.

12. A downhole tool according to claim 10 wherein each of the plurality of first wireless data transceivers operates at a different frequency from frequencies of other transceivers.

13. A downhole tool according to claim 12 wherein said each of the plurality of first wireless data transceivers comprises a filter configured to block the frequencies of the other transceivers.

14. A downhole tool according to claim 10 one of the plurality of first wireless data transceivers transmits and receives in a 434 megahertz band.

15. A downhole tool according to claim 14 wherein another one of the plurality of first wireless data transceivers transmits and receives in a 315 megahertz band.

16. A downhole tool according to claim 10 wherein each of the plurality of first wireless data transceivers operates at multiple frequencies contemporaneously.

17. A downhole tool according to claim 10 further comprising a downhole tool controller configured to split a single data stream into a plurality of parts and to control the plurality of first wireless data transceivers such that each of the plurality of parts is transmitted on a corresponding one of the plurality of first wireless data transceivers.

18. A downhole tool according to claim 9 further comprising a plurality of downhole tool assemblies, each of the assemblies comprising a memory of a plurality of memories wherein the wireless data transceiver is provided in a transceiver/logging device configured to automatically retrieve logged data from the memories of the assemblies, log the retrieved logged data in the data store and upload the retrieved logged data when the downhole tool reaches an uphole surface.

19. A downhole tool according to claim 18 wherein the transceiver/logging device comprises a processor.

20. A downhole tool according to claim 19 wherein the processor of the transceiver/logging device is configured to periodically poll different ones of the assemblies and to receive and to store readings of diagnostic registers of the assemblies in the data store.

21. A downhole tool according to claim 20 wherein the assemblies are programmed to periodically transmit selected data to the transceiver/logging device.

22. A downhole tool according to claim 19 wherein the processor of the transceiver/logging device is configured to perform bus monitoring searches for atypical tool behaviour.

23. A downhole tool according to claim 22 wherein the bus monitoring searches comprise logging traffic on a data bus connecting the assemblies in response to one or more flags being triggered.

24. A downhole tool according to claim 9 wherein the transceiver has a standby mode in which it is generally powered down except for a low power circuit that detects whether or not the transceiver is within range of another compatible transceiver and the transceiver is configured to switch from the standby mode into an active mode in response to detecting a radio signal from the compatible transceiver.

25. A method for establishing data communication with a downhole tool comprising a data processor, a gap sub comprising a first electrically-conductive portion and a second electrically-conductive portion separated by an electrically-insulating gap from the first electrically-conductive portion, and a single-wire bus providing a data connection between the first electrically-conductive portion and a network interface in communication with the data processor, the method comprising:
   electrically contacting a first surface formed at least in part by the first electrically-conductive portion and a second surface formed at least in part by the second electrically-conductive portion with first and second electrical conductors;
   applying electrical signals modulated to carry data to the first surface and the second surface by way of the first and second electrical conductors; and
   detecting the electrical signals at a receiver in the downhole tool;
   wherein the first surface and second surface form part of an exterior of the gap sub;
   the network interface comprises a node of the single-wire bus; and
   one of the first and second electrical conductors provides a reference potential for the single-wire bus.

26. The method of claim 25 further comprising holding the first and second electrical conductors in electrical contact with the first surface and the second surface.

27. The method of claim 25 wherein the downhole tool further comprises an electromagnetic telemetry receiver connected between the first electrically-conductive portion and the second electrically-conductive portion and the method further comprises detecting the electrical signals by the electromagnetic telemetry receiver.

* * * * *

UNITED STATES PATENT AND TRADEMARK OFFICE
CERTIFICATE OF CORRECTION

PATENT NO. : 10,392,928 B2
APPLICATION NO. : 15/564578
DATED : August 27, 2019
INVENTOR(S) : Robin Cody Robson et al.

Page 1 of 1

It is certified that error appears in the above-identified patent and that said Letters Patent is hereby corrected as shown below:

In the Claims

Column 11, Lines 22-24:
"14. A downhole tool according to claim 10 one of the plurality of first wireless data transceivers transmits and receives in a 434 megahertz band."

Should read:
--14. A downhole tool according to claim 10 wherein one of the plurality of first wireless data transceivers transmits and receives in a 434 megahertz band.--

Signed and Sealed this
Twenty-ninth Day of December, 2020

Andrei Iancu
*Director of the United States Patent and Trademark Office*